United States Patent
Steinhauser (10) Patent No.: US 10,443,754 B2
(45) Date of Patent: Oct. 15, 2019

(54) DRIVE SYSTEM FOR AN EXHAUST GAS FLAP

(71) Applicant: Faurecia Emissions Control Technologies, Germany GmbH, Augsburg (DE)

(72) Inventor: Otto Steinhauser, Augsburg (DE)

(73) Assignee: Faurecia Emissions Control Technologies, GmbH (DE)

( * ) Notice: Subject to any disclaimer, the term of this patent is extended or adjusted under 35 U.S.C. 154(b) by 321 days.

(21) Appl. No.: 15/431,819

(22) Filed: Feb. 14, 2017

(65) Prior Publication Data

US 2017/0254433 A1 Sep. 7, 2017

(30) Foreign Application Priority Data

Mar. 7, 2016 (DE) .......................... 10 2016 104 102

(51) Int. Cl.
*F16K 31/04* (2006.01)
*F01N 13/08* (2010.01)

(52) U.S. Cl.
CPC ............ *F16K 31/043* (2013.01); *F01N 13/08* (2013.01); *F01N 2240/36* (2013.01); *F01N 2390/00* (2013.01)

(58) Field of Classification Search
CPC .......... F16D 31/043; F16D 3/50; F01N 13/08; F01N 2240/36; F01N 2390/00; F16K 35/06
USPC ....................................................... 251/293
See application file for complete search history.

(56) References Cited

U.S. PATENT DOCUMENTS

2017/0268433 A1* 9/2017 Aigner ....................... F16D 3/72
2018/0010693 A1* 1/2018 Schmitt ................... F02D 9/1005

FOREIGN PATENT DOCUMENTS

| DE | 102009013815 A1 | 9/2010 | |
| DE | 102009016597 A1 | 10/2010 | |
| DE | 102011107088 A1 | 1/2013 | |
| DE | 102014017523 A1 | 6/2015 | |
| DE | 102014113332 B3 * | 11/2015 | ............... F02D 9/04 |
| DE | 102014113332 B3 | 11/2015 | |
| DE | 102014118492 A1 | 6/2016 | |
| DE | 102015222609 A1 * | 5/2017 | ............... F02D 9/04 |
| DE | 102016203794 A1 * | 9/2017 | |
| WO | 2015078432 A1 | 4/2015 | |

OTHER PUBLICATIONS

DE102014113332, Machine Translation, Translated on Feb. 25, 2019.*
English Summary of German Search Report, dated Sep. 21, 2016.

* cited by examiner

*Primary Examiner* — Patrick D Maines
(74) *Attorney, Agent, or Firm* — Carlson, Gaskey & Olds, P.C (57) ABSTRACT

A drive system for an exhaust gas flap of a vehicle exhaust gas system includes a drive element that is connected to an adjustment drive and an output element that is connected to an exhaust gas flap spindle. A resilient element is arranged between the drive element and the output element and comprises a center section and two end sections. The center section is used to transfer torque between the drive element and the output element, and wherein the center section and two end sections are coupled to the drive element or to the output element.

19 Claims, 5 Drawing Sheets

DRIVE SYSTEM FOR AN EXHAUST GAS FLAP

CROSS-REFERENCE TO RELATED APPLICATIONS

This application claims priority to DE 10 2016 104 102.5, filed Mar. 7, 2016.

FIELD OF THE INVENTION

The present invention relates to a drive system for an exhaust gas flap of a vehicle exhaust gas system.

BACKGROUND

It is known to use adjustable exhaust gas flaps in exhaust gas systems of internal combustion engines and when using said flaps it is possible to selectively close or open a cross section of an exhaust gas pipe. These exhaust gas flaps are moved by an adjustment drive. It is possible to positively influence the consumption of fuel and/or the harmful emissions of an internal combustion engine by selectively opening and closing the exhaust gas flaps. Furthermore, it is possible with such exhaust gas flaps to control the noise behavior of an internal combustion engine.

Moreover, exhaust gas flaps are used in connection with cylinder deactivations. In this case, the exhaust gas pipes that are associated with the cylinders that are to be deactivated are closed by means of exhaust gas flaps.

Exemplary exhaust gas flaps and their drive systems are disclosed in DE 10 2009 016 597 A1, WO 2015/078432 A1, DE 10 2009 013 815 A1 and also DE 10 2011 107 088 A1.

Owing to the intense thermal and heavy mechanical load on exhaust gas flaps and their drive systems, the coupling of the drive system to the exhaust gas flap is of great importance. Coupling elements that connect the adjustment drive and the exhaust gas flap are generally loaded in two ways. On the one hand, it is necessary for the coupling elements to transfer torque from the adjustment drive to the exhaust gas flap in order to open and to close the exhaust gas flap. On the other hand, an axial force is applied by way of the coupling element to the mounting arrangement of the exhaust gas flap. The axial force is necessary in order to seal the spindle feedthrough of the exhaust gas flap. Furthermore, vibrations that make themselves noticeable acoustically as rattles are avoided via the axial force.

The aim is to embody the transfer path of the torque as rigidly as possible in order to be able to move the exhaust gas flap as precisely as possible and in such a manner that causes few vibrations. However, in the case of the axial coupling, a high rigidity causes a high friction on the spindle feedthrough of the exhaust gas flap, and thereby a mechanical load of the associated sealing arrangement and also an increased resistance when moving the exhaust gas flap. The aim is therefore to embody the axial coupling as less rigid, in other words as more elastic. There is, in other words, a conflict of objectives with regard to the requirements of the rigidities of the coupling between the adjustment drive and the exhaust gas flap. This leads to the fact that in the prior art it is always necessary to find a compromise between the axial rigidity of the coupling and the rigidity of the transfer path of torque. There is a need for an improvement.

SUMMARY

The object of the present invention is therefore to provide a drive system for an exhaust gas flap in which the coupling of an adjustment drive to an exhaust gas flap is rigid for the transfer of torque and is flexible for axial movements.

The object is achieved when a drive system for an exhaust gas flap of a vehicle exhaust gas system, said drive system having a drive element and an output element, wherein the drive element is provided for the purpose of being connected to an adjustment drive and the output element is provided for the purpose of being connected to an exhaust gas spindle. A resilient element is provided that is arranged between the drive element and the output element and comprises a center section and two end sections. The center section is used to transfer torque between the drive element and the output element, and both the center section as well as the two end sections are coupled to the same component of the two elements: drive element and output element. In accordance with the invention, multiple sections of the resilient element, namely the center section and the two end sections are connected to the same component, in other words either to the drive element or to the output element. The other of the two elements is connected to another section of the resilient element so that torque can be transferred from the drive element to the output element.

The construction in accordance with the invention is technically simple and cost-effective. The resilient element represents a reliable and cost-effective possibility for coupling the drive element and the output element. The resilient element can be constructed in a rotationally symmetrical manner. The center section of the resilient element is preferably embodied as a straight section.

According to one advantageous embodiment, the center section is connected by way of two connecting sections to the end sections, and the connecting sections are used to transfer torque between the drive element and output element, wherein the connecting sections are coupled to the output element or the drive element. The resilient element is, in other words, constructed in a symmetrical manner. As a consequence, there is a uniform loading of the components of the drive system for an exhaust gas flap, which results in a high functional reliability and an increased serviceable life. The transfer path of torque between the drive element and the output element comprises the center section and the connecting sections. If the center section is coupled to the drive element, the connecting sections are coupled to the output element. In the reverse case, if the center section is coupled to the output element, the connecting sections are coupled to the drive element. The resilient element can in other words be arranged in two orientations. The fact that two connecting sections are provided leads to a reliable and uniform transfer of torque.

Advantageously, the connecting sections in each case engage in a slot that extends parallel to the axis of rotation of the drive element or the output element. The transfer path for the torque is thereby divided into two paths, which reduces the load peaks in the drive system. As a consequence, the serviceable life of the drive system increases. Furthermore, it is possible to assemble the connecting sections in the slots without using tools and in a simple manner. The connecting sections are guided in the slots in the direction of the axis of rotation of the drive element or the output element. The connecting sections can transfer torque by way of the walls of the slot. Simultaneously, the base of the slot or a geometric shape in the walls of the slots represents a stopping element or abutment for the connecting sections in the axial direction.

It is preferred that the connecting sections are mounted in the slots in such a manner that said connecting sections can be moved in a direction perpendicular with respect to the axis of rotation slightly along the walls of the slots. As a consequence, it is possible in a simple constructive manner to compensate for a possible axis offset between the exhaust gas flap spindle and the adjustment drive. The drive system is consequently effectively prevented from jamming.

In one embodiment, the slots are arranged in a U-shaped receiving element and are located in the arms of the U-shape, wherein the slots are preferably open on one side. A simple assembly of the connecting sections is possible by virtue of the slots being open on one side. The arrangement in the U-shape furthermore causes a uniform loading of the components of the drive system. The receiving element can, for example, be a press-bent part of sheet metal or a synthetic material. The receiving element can be fixedly connected to the drive element or the output element.

A further development provides that the connecting sections comprise, in each case, two resilient sections that extend essentially adjacent to one another and comprise a resilient section that connects said resilient elements, wherein the resilient section is preferably a resilient bow. The connecting sections are consequently produced in a manner that saves materials and are therefore light in weight. The connecting sections essentially have the shape of a U, wherein the resilient sections that extend adjacent to one another represent the arms of the U. The resilient sections that extend adjacent to one another can extend parallel or inclined towards each other and can lie on the walls of the slots. The connecting resilient section represents the base line of the U-shape. The connecting resilient section can be embodied as round, with corners or having a free geometric shape.

Moreover, in the load-free state, the center section and the connecting sections lie in a plane and the end sections lie in a plane that is spaced therefrom. It is possible to produce the resilient element in a simple and cost-effective manner by virtue of this embodiment. Simultaneously, the planar shape renders it possible to have a cost-effective mounting arrangement and handling procedure. It is possible by way of the spacing of the planes to set the resilient paths that are to be available to the resilient element. Furthermore, the end sections and the center sections can be adjusted to different embodiments of the drive system for an exhaust gas flap.

In accordance with one embodiment, the center section engages in a groove that is provided on the drive element or on the output element, wherein the longitudinal axis of the groove extends in a transverse manner, and in particular, in a manner perpendicular with respect to the axis of rotation of the drive element or the output element. The groove represents a possibility that is easy to produce of coupling the drive element or the output element to the resilient element so that torque can be transferred. The torque is transferred from the walls of the groove to the center section or in reverse. The center section preferably does not lie on the groove base.

The center section of the resilient element is preferably embodied geometrically slightly longer than the groove. The resilient element can consequently be displaced slightly along the groove. It is thus possible in a simple manner to compensate for a possible axis offset between the exhaust gas flap spindle and the adjustment drive. The drive is consequently prevented from jamming.

It is particularly advantageous if the direction in which the center section can be displaced in the groove is perpendicular to the direction in which the connecting sections can be displaced in the slots. It is then possible in a particularly effective manner to compensate for an alignment error or axis offset of the exhaust gas flap spindle with respect to the adjustment drive. This is also possible during a rotation of the drive system.

Moreover, it is possible to allocate a hole to the groove and the two end sections engage into said hole. The resilient element is thereby held securely. Moreover, the possible sharp-edged end sections are no longer accessible, which reduces the risk of injury during assembly and disassembly procedures. It is possible with the aid of the peripheral surface of the hole to transfer an axial force from the drive element or output element to the end sections of the resilient element. Optionally, it is possible for the end sections to lie closely on the peripheral surface of the hole in such a manner that torque can also be transferred from the drive element or output element to the end sections. Alternatively, the diameter of the hole can also be selected as clearly greater than the diameter of the end sections of the resilient element. In this case, it is only possible to transfer an axial force but not to transfer torque.

The center axis of the hole preferably extends in a transverse manner, and in particular, in a manner perpendicular with respect to the longitudinal axis of the groove. The groove and the hole can intersect. A simple, cost-effective but reliable coupling of the resilient element to the drive element or the output element is ensured. This coupling can likewise be achieved, in particular if the groove and hole intersect, in the tightest of spaces.

According to an alternative embodiment, the two end sections engage into the groove, wherein the end sections lie on the groove base. Both the end sections as well as the center section are then mounted in the same groove. The end sections and center section thereby lie in a plane. It is not necessary to provide a hole in this embodiment, which reduces production costs.

In one variant, the center section of the resilient element can be reinforced or can be embodied in a multi-layered manner. This is achieved as a consequence of a greater rigidity of the center section, which causes a greater rigidity of the transfer path for torque. The end sections can remain single-layered or not reinforced so that the rigidity of a transfer path is proportionally low for an axial coupling.

According to a preferred further development, a rigidity of the resilient element for transferring torque between the drive element and the output element is greater than a rigidity of the resilient element for axially coupling in a resilient manner the drive element and the output element. Since different sections of the resilient element are provided for the transfer of the torque and the transfer of axial forces, an independent setting of the rigidity with regard to these two load types is possible. The high rigidity for transferring torque is achieved by the center section and the connecting sections. The exhaust gas flap can thereby be positioned precisely in a closed state, in an opened state, and any state lying between the closed and open states. Simultaneously, a high rigidity prevents rotational vibrations of the exhaust gas flap. The lesser rigidity for providing the axial resilient coupling arrangement is achieved by means of the end sections. There are advantages with regards to the serviceable life and also the tightness of the spindle feedthrough of the exhaust gas flap.

In one embodiment, the resilient element is produced from a resilient wire. The resilient element can thereby be produced in a cost-effective manner and in large quantities. The production can, in particular, occur by bending a single resilient wire piece, which is a well-known and widely used production method. The resilient element can thereby be constructed in the following manner when viewed from one end of the resilient wire to the other end: end section, connecting section, center section, connecting section, end section. The connecting sections are embodied in each case from a first of the resilient sections that extend adjacent to one another, a connecting resilient section, and a second of the resilient sections that extend adjacent to one another. The resilient element can be constructed in a rotationally symmetrical manner.

It is preferred that the resilient element in a plan view is in the shape of an eight, wherein the center section forms a center section of the eight and the connecting sections essentially form the outer contour of the eight.

BRIEF DESCRIPTION OF THE DRAWINGS

The invention is further explained hereinunder with reference to various exemplary embodiments that are illustrated in the attached drawings. In the figures:

FIG. 9 illustrates in detail the resilient element of the drive system in accordance with the invention in FIG. 7, FIG. 10 schematically illustrates an alternative embodiment where the drive element is coupled to the output element in a kinematic reversed manner from that shown in FIG. 1.

DETAILED DESCRIPTION

Figure 1:
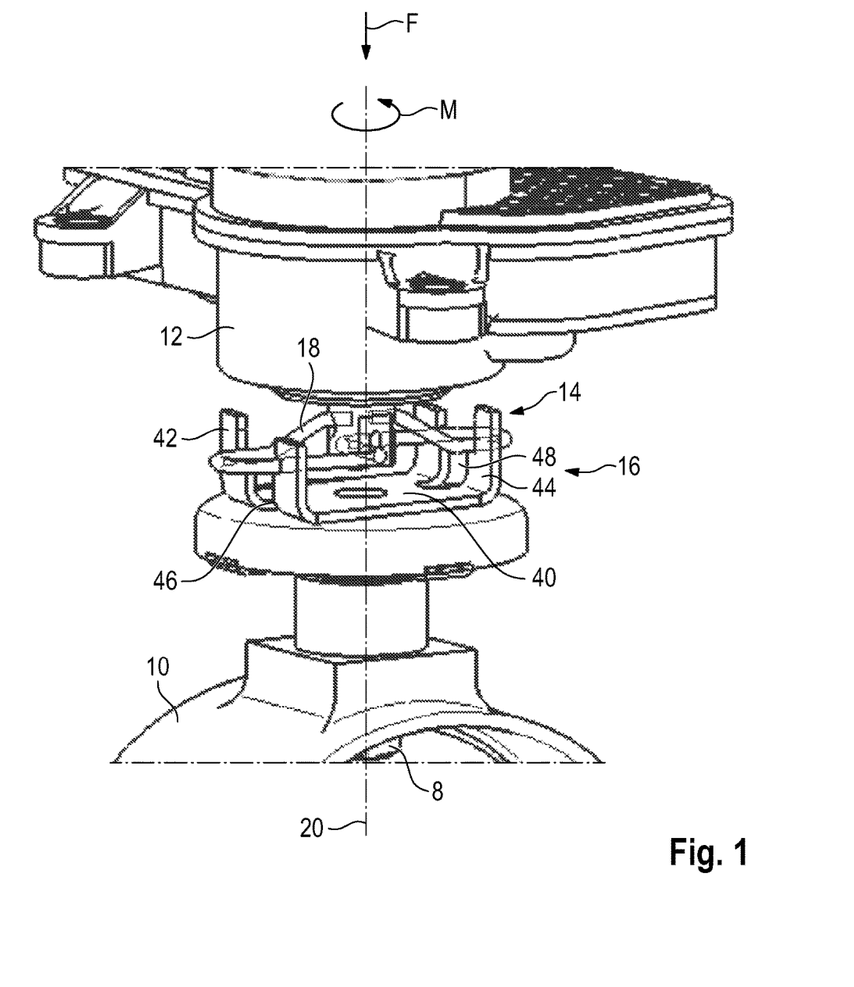
FIG. 1 illustrates a perspective view of the drive system in accordance with the invention for an exhaust gas flap.

FIG. 1 illustrates non-detailed view of a drive system for an exhaust gas flap.

The exhaust gas flap is received in a housing 10 in such a manner that said exhaust gas flap can be adjusted by an exhaust gas flap spindle 8. The exhaust gas flap can be adjusted within the housing 10 between a closed position by way of intermediate positions into an opened position, and in reverse.

An adjustment drive 12 is provided for adjusting the exhaust gas flap. The adjustment drive 12 is used for the purpose of providing a rotational movement in response to external control signals in order to thereby adjust the exhaust gas flap. By way of example, a servomotor can be used in the adjustment drive 12.

The drive system is provided in order to couple the adjustment drive 12 to the spindle 8. The drive system includes a drive element 14, that can be adjusted by the adjustment drive 12, an output element 16 that is connected in a non-rotatable manner to the exhaust gas flap spindle 8, and a resilient element 18 that couples the drive element 14 to the output element 16.

The adjustment drive 12 and the exhaust gas flap spindle 8 are arranged on a common axis of rotation 20.

Figure 2:
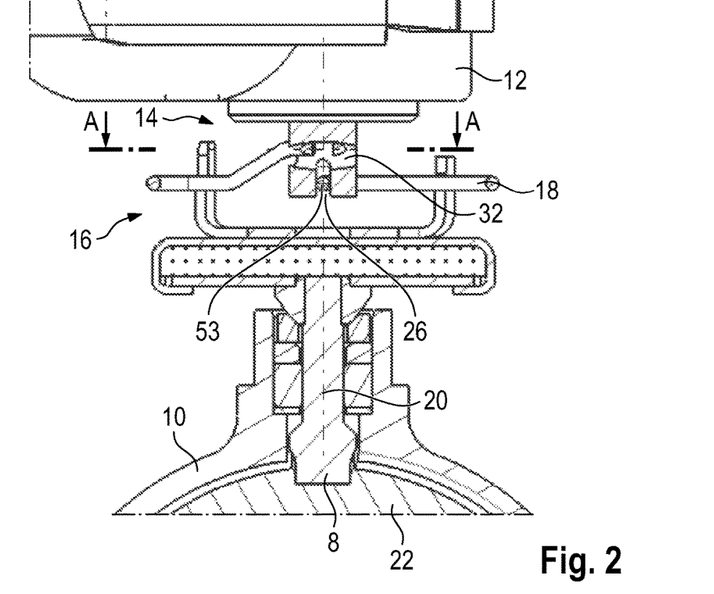
FIG. 2 illustrates a sectional side view of the drive system in accordance with the invention in FIG. 1.
Figure 3:
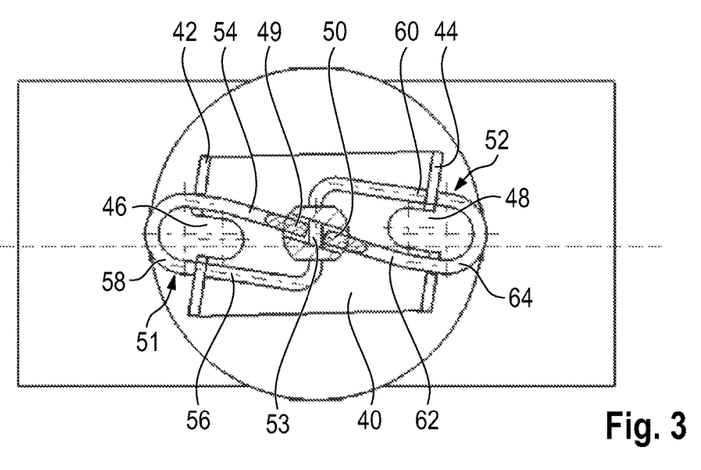
FIG. 3 illustrates a sectional view A-A of FIG. 2.
Figure 4:
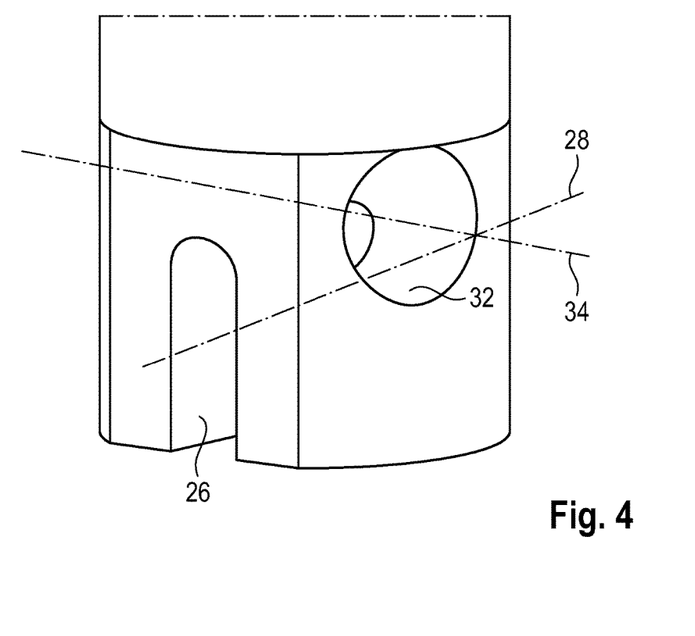
FIG. 4 illustrates in detail the drive element of the drive system in accordance with the invention in FIG. 1.

The drive element 14 is illustrated in FIG. 2, FIG. 3 and FIG. 4. The drive element 14 is embodied in the illustrated embodiment as a shaft end of the adjustment drive 12.

A groove 26 having a longitudinal axis 28 is provided in the end surface of the shaft end.

Furthermore, a hole 32 having a center axis 34 is arranged in the shaft end, said hole 32 extending essentially in a manner perpendicular with respect to the groove 26 and intersecting said groove 26 in the illustrated exemplary embodiment.

The output element 16 and the exhaust gas flap spindle 8 are illustrated in FIG. 2 and FIG. 3. The two are connected to one another in such a manner that they cannot rotate. The sectional plane is selected in FIG. 2 in such a manner that the axis of rotation 20 is included. The exhaust gas flap 22 that is connected in a non-rotatable manner to the exhaust gas spindle 8 is simultaneously rotated in the sectional plane.

The output element 16 comprises a U-shaped receiving element 40 having two arms 42, 44. The two arms 42, 44 are provided with, in each case, one slot 46, 48, wherein the two slots 46, 48 extend parallel to the axis of rotation 20 and are open on one side. In FIG. 2, the side of the slots 46, 48 that is facing the adjustment drive 12 is open.

Figure 5:
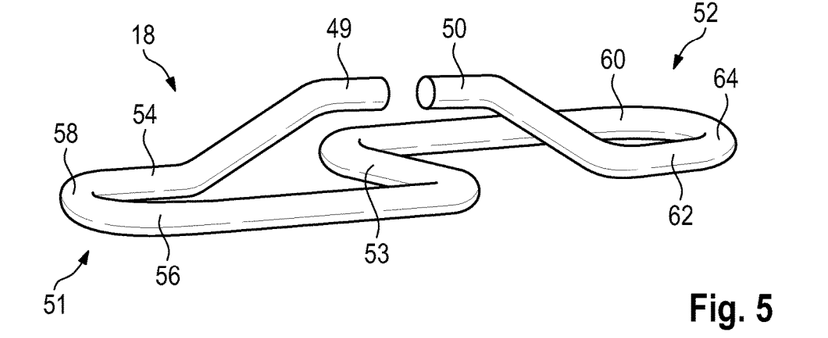
FIG. 5 illustrates in detail the resilient element of the drive system in accordance with the invention in FIG. 1.

The shape of the resilient element 18 is evident in FIG. 3 and FIG. 5.

The resilient element comprises two end sections 49, 50 that are connected by way of two connecting sections 51, 52 to a center section 53.

The connecting section 51 is embodied from two resilient sections 54, 56 that extend adjacent to one another and also a resilient section 58 that connects said resilient sections 54, 56. The resilient section 58 is embodied as a resilient bow.

Similarly, the connecting section 52 is embodied from two resilient sections 60, 62 that extend adjacent to one another and are connected by way of a resilient section 64. The resilient section 64 is likewise embodied as a resilient bow.

Starting from the end section 49, the resilient element 18 is consequently constructed in the following manner: end section 49, first adjacent-extending resilient section 54 of the connecting section 51, connecting resilient section 58 of the connecting section 51, second adjacent-extending resilient section 56 of the connecting section 51, center section 53, first adjacent-extending resilient section 60 of the connecting section 52, connecting resilient section 64 of the connecting section 52, second adjacent-extending resilient section 62 of the connecting section 52, end section 50.

In the view illustrated in FIG. 3, a plan view, the resilient element 18 is in the shape of an eight. The center section 53 of the resilient element 18 also forms a center section of the eight. An outer contour of the eight is represented by the connecting sections 51, 52.

Moreover, the connecting section 51, the center section 53 and also the connecting section 52 lie in a first plane. The end sections 49, 50 lie in a second plane that is spaced from the first plane (cf. FIG. 5).

The resilient element 18 can be constructed in a rotationally symmetrical manner. The axis of rotation corresponds in the installed state to the axis of rotation 20.

Figure 6:
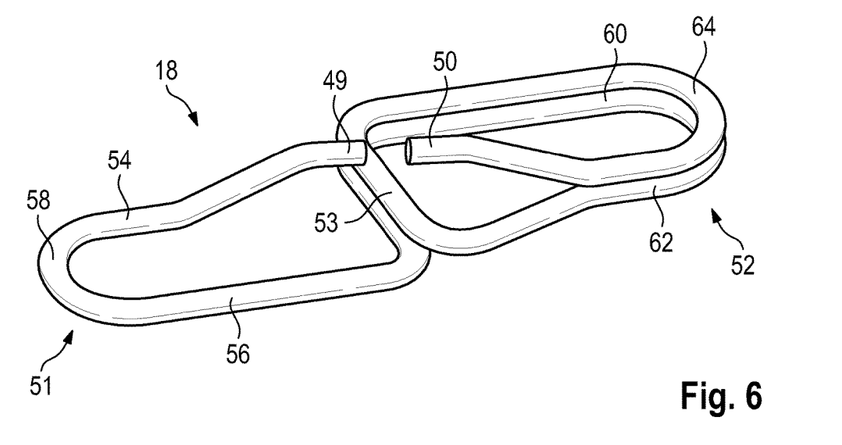
FIG. 6 illustrates in detail an alternative embodiment of the resilient element of the drive system in accordance with the invention in FIG. 1.

An alternative embodiment of the resilient element 18 is illustrated in FIG. 6. In this embodiment, the center section 53 is embodied as two-layered, as a result of which the rigidity of the center section increases. The end sections 49, 50 are not reinforced, in other words are embodied as single-layered.

The resilient element 18 is coupled to the drive element 14 in such a manner that the center section 53 is received in the groove 26 of the drive element 14. The center section 53 is guided from the walls of the groove 26 and can move in the direction of a groove depth since said center section 53 does not lie on the base of the groove 26.

It is evident that the center section 53 is slightly longer than the groove 26. The center section 53 can therefore be displaced in the groove 26 in order to compensate for an axis offset that may be present. This is the case if the adjustment drive 12 and the exhaust gas flap spindle 8 are not arranged on a common axis of rotation 20.

The end sections 49, 50 are likewise coupled to the drive element 14. The end sections are received in the hole 32. The diameter of the hole 32 and of the end sections 49, 50 are adjusted in such a manner that the diameter of the end sections 49, 50 is smaller than the diameter of the hole 32. The section of the peripheral surface of the hole 32 that is illustrated in the upper section in FIG. 2 is used as stopping surface or abutment for the end sections 49, 50.

The connecting sections 51, 52 are mounted in the slots 46, 48.

When viewing FIG. 2 and FIG. 3 together, the type of mounting arrangement of the connecting sections 51, 52 in the slots 46, 48 is evident. In order to have a stop on the output element 16 in the direction of the axis of rotation 20, the connecting sections 51, 52 are mounted in a notch or by a step in the slots 46, 48.

The connecting sections 51, 52 are mounted on the walls of the slots in the peripheral direction.

The connecting sections 51, 52 can be displaceable in a manner perpendicular with respect to the axis of rotation 20 along the walls of the slots 46, 48. An axis offset can consequently be compensated for in this direction, said axis offset occurring if the adjustment drive 12 and the exhaust gas flap spindle 8 are not arranged on a common axis of rotation 20.

As is evident in FIG. 3, the displacement direction of the center section 53 is essentially perpendicular to the displacement direction of the connecting sections 51, 52.

The force flows and torque flows are described hereinunder. By way of example, it is assumed that a pressure force F is exerted by the drive element 14 in the axial direction.

This pressure force F is initially transferred by way of the peripheral surface of the hole 32 to the end sections 49, 50 of the resilient element 18. The pressure force F is not transferred to the center section 53 of the resilient element 18 since said center section can be displaced freely in the groove 26 in the direction in which the pressure force F acts.

Starting from the end sections 49, 50, the pressure force F is then transferred to the connecting sections 51, 52 of the resilient element 18. The pressure force is received with an axial stop in the U-shaped receiving element 40. The pressure force F is transferred by way of this stop from the resilient element 18 to the U-shaped receiving element 40 and in turn from said receiving element 40 to the output element 16.

If torque M is transferred from the drive element 14 to the output element 16, the torque flow is as follows:

The drive element 14 transfers by way of the walls of the groove 26 the torque M to the center section 53 of the resilient element 18. Since the hole 32 is embodied as clearly larger in diameter than the diameter of the end sections 49, 50 of the resilient element 18, torque M is not transferred by way of the end sections 49, 50.

Starting from the center section 53, the torque M is introduced into the connecting sections 51, 52. The connecting sections are mounted in slots 46, 48 in such a manner that the walls of the slots 46, 48 lie in the direction of rotation on the respective adjacent resilient sections 54, 56 or 60, 62. The torque M is consequently transferred by way of the slots 46, 48 to the U-shaped receiving element 40. The receiving element 40 is connected to the output element 16.

Figure 7:
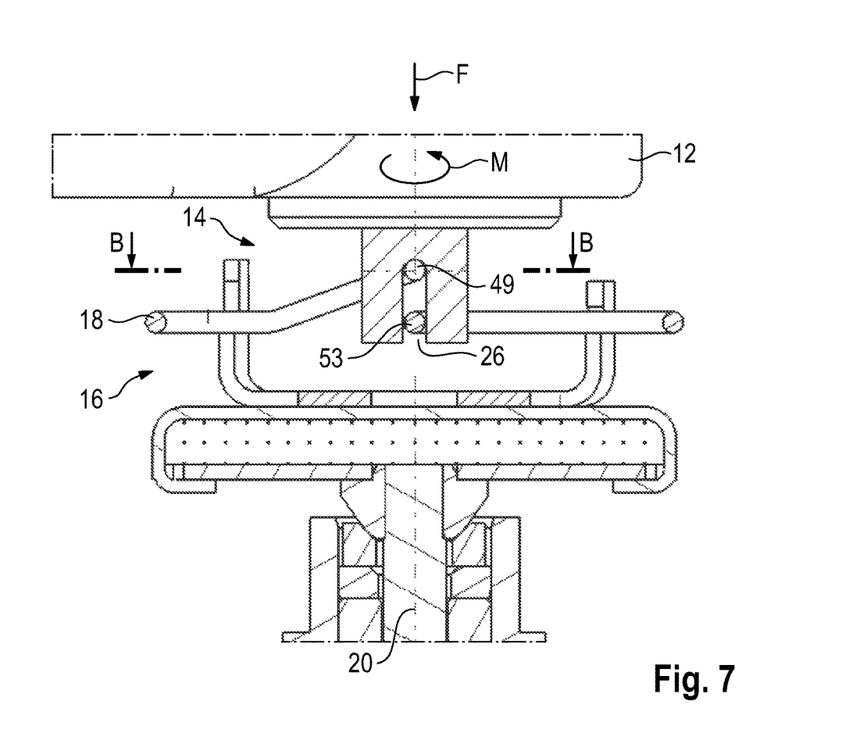
FIG. 7 illustrates a sectional side view of an alternative embodiment of the drive system in accordance with the invention.
Figure 8:
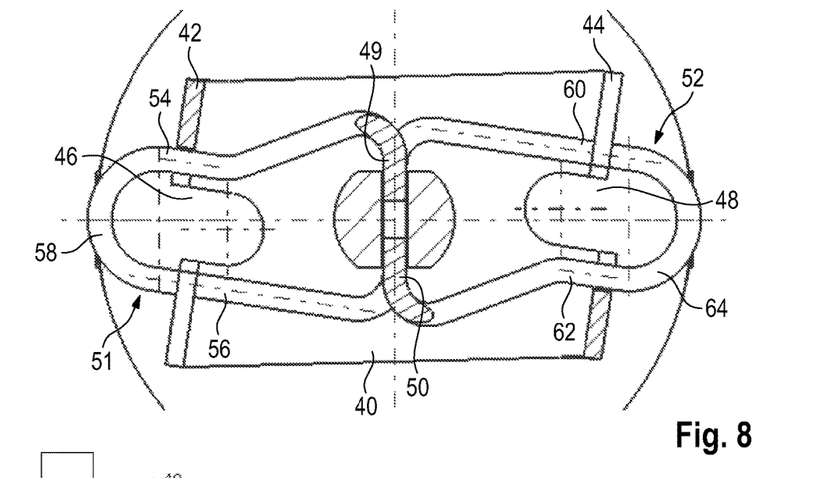
FIG. 8 illustrates a sectional view B-B of FIG. 7.
Figures 9, 10:
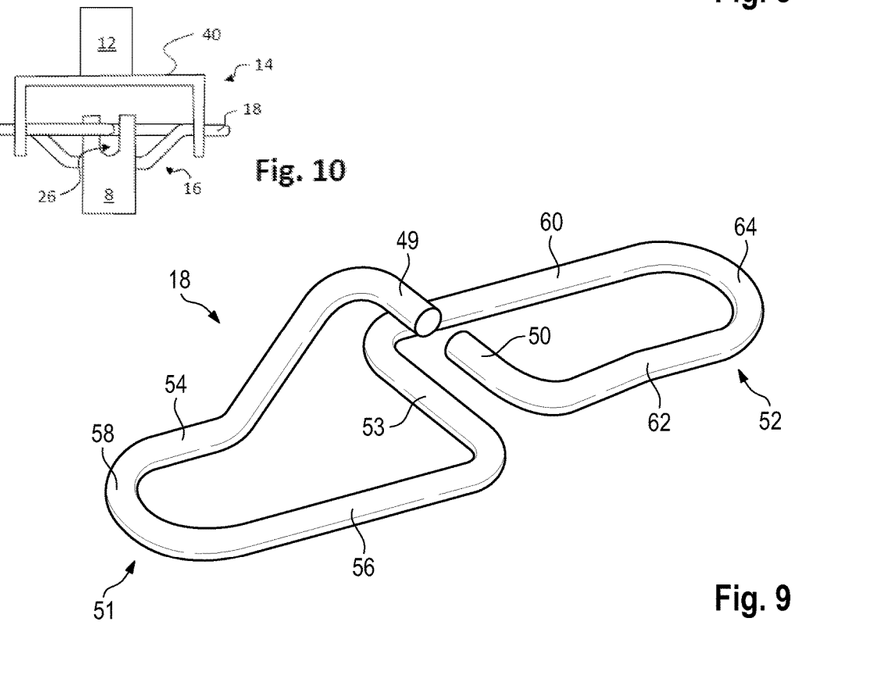

An alternative embodiment of the drive system is illustrated in FIG. 7, FIG. 8 and FIG. 9. In comparison to the above-mentioned embodiment, the drive element 14 and the resilient element 18 are embodied differently.

The drive element 14, which is also embodied in this case as a shaft end of the adjustment drive 12, comprises a groove 26 having a longitudinal axis (not-illustrated) that extends in a manner perpendicular with respect to the axis of rotation 20 of the drive element 14 or the output element 16. A hole is not provided in this embodiment.

In the case of the resilient element 18 (cf. FIG. 9), the end sections 49, 50 extend parallel to the center section 53. The resilient element 18 comprises an additional bend, in other words, between the resilient sections 54, 62 and the respective associated end sections 49, 50.

As in the first-mentioned exemplary embodiment, the connecting section 51, the center section 53 and also the connecting section 52 lie in a first plane. The end sections 49, 50 lie in a second plane that is spaced from the first plane (cf. FIG. 9). Simultaneously, the end sections 49, 50 lie with the center section 53 in another plane.

The U-shaped receiving element 40 does not differ from the first-mentioned embodiment.

As is evident in FIG. 7 and FIG. 8, both the end sections 49, 50 as well as the center section 53 are mounted in the groove 26 of the drive element 14. The end sections 49, 50 lie on the base of the groove 26. The center section 53 lies only on the walls of the groove 26.

The center section 53 and the end sections 49, 50 are embodied in such a manner that they can be displaced slightly along the groove 26 in order to be able to compensate for a possible axis offset that occurs if the adjustment drive 12 and the exhaust gas flap spindle 8 are not arranged on a common axis of rotation 20.

The force flows and torque flows for this exemplary embodiment are described hereinunder. It is assumed that a pressure force F is exerted by the drive element 14 in the axial direction.

This pressure force F is initially transferred by way of the groove base of the groove 26 to the end sections 49, 50 of the resilient element 18. The pressure force F is not transferred to the center section 53 of the resilient element 18 since said center section can be displaced freely in the groove 26 in the direction in which the pressure force F acts.

Starting from the end sections 49, 50, the pressure force F is then transferred to the connecting sections 51, 52 of the resilient element 18. The interaction with the U-shaped receiving element 40 then occurs as in the first-mentioned exemplary embodiment.

The resilient sections between the groove base where the end sections 49, 50 lie, and the slots 46, 48 where the opposite-lying resilient sections 54, 56, 60, 62 lie are longer in this exemplary embodiment than in the case of the first-mentioned exemplary embodiment. As a result of this, in the case of the otherwise identical embodiment of the resilient element 18, there is reduced axial rigidity.

If torque M is transferred from the drive element 14 to the output element 16, the torque flow is as follows:

The drive element 14 transfers by way of the walls of the groove 26 the torque M to the center section 53 and to the two end sections 49, 50 of the resilient element 18. Starting therefrom, the torque M is introduced into the connecting sections 51, 52. The interaction with the U-shaped receiving element 40 then occurs as in the first-mentioned exemplary embodiment.

Deviating from the illustrated exemplary embodiments, the drive element 14 can also be coupled to the output element 16 in the kinematic reversed manner. The U-shaped receiving element 40 would then be mounted on the drive side and the output side would comprise a shaft end having a groove 26 as shown in FIG. 10. The resilient element 18 would accordingly be installed rotated about 180°.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A drive system for an exhaust gas flap of a vehicle exhaust gas system comprising:
   a drive element is provided for the purpose of being connected to an adjustment drive; and
   an output element is provided for the purpose of being connected to an exhaust gas spindle,
   wherein a resilient element is provided that is arranged between the drive element and the output element and comprises a center section and two end sections,
   wherein the center section is used to transfer torque between the drive element and the output element, and
   wherein the center section and the two end sections are coupled to the drive element or wherein the center section and the tow end sections are coupled to the output element.

2. The drive system as set forth in claim 1, wherein the center section is connected by way of two connecting sections to the end sections, and the connecting sections are used to transfer torque between the drive element and output element, wherein the connecting sections are coupled to the output element or the drive element.

3. The drive system as set forth in claim 2, wherein each of the connecting sections is engaged in a slot that extends parallel to the axis of rotation of the drive element or the output element.

4. The drive system as set forth in claim 3, wherein the slots are arranged in a U-shaped receiving element, and the slots are located in arms of the U-shape, and wherein the slots are open on one side.

5. The drive system as set forth in claim 2, wherein each of the connecting sections comprise two resilient sections that extend adjacent to one another and comprise a connecting resilient section that connects said two resilient sections.

6. The drive system as set forth in claim 2, wherein in a load-free state the center section and the connecting sections lie in a first plane and the end sections lie in a second plane that is spaced from the first plane.

7. The drive system as set forth in claim 2, wherein the resilient element in a plan view is in a shape of an eight, wherein the center section forms a center section of the eight and the connecting sections form an outer contour of the eight.

8. The drive system as set forth in claim 1, wherein the center section engages in a groove that is provided on the drive element or on the output element, wherein a longitudinal axis of the groove extends in a transverse manner and in a manner perpendicular with respect to an axis of rotation of the drive element or the output element.

9. The drive system as set forth in claim 8, wherein the groove is allocated a hole and the two end sections engage in said hole.

10. The drive system as set forth in claim 9, wherein a center axis of the hole extends in a transverse manner and in a manner perpendicular with respect to the longitudinal axis of the groove.

11. The drive system as set forth in claim 8, wherein the two end sections engage into the groove, wherein the two end sections lie on a base of the groove.

12. The drive system as set forth in claim 1, wherein the center section of the resilient element is reinforced or is embodied in a multi-layered manner.

13. The drive system as set forth in claim 1, wherein a rigidity of the resilient element for transferring torque between the drive element and the output element is greater than a rigidity of the resilient element for axially coupling in a resilient manner the drive element and the output element.

14. The drive system as set forth in claim 1, wherein the resilient element is comprised of a resilient wire.

15. The drive system as set forth in claim 1, wherein one of the drive element and the output element includes a shaft end, and wherein the center section and the two end sections are directly coupled to the shaft end.

16. The drive system as set forth in claim 15, wherein the shaft end includes a shaft end face with a groove, and wherein the center section and the two end sections are directly received within the groove.

17. The drive system as set forth in claim 16, wherein the other of the drive element and the output element includes a receiving element with slots, and wherein the two end sections are connected by way of two connecting sections to the center section, and wherein the two connecting sections are mounted in the slots.

18. The drive system as set forth in claim 15, wherein the shaft end includes a shaft end face with a groove and a hole, and wherein the center section is directly received within the groove and the two end sections are directly received within the hole.

19. The drive system as set forth in claim 18, wherein the other of the drive element and the output element includes a receiving element with slots, and wherein the two end sections are connected by way of two connecting sections to the center section, and wherein the two connecting sections are mounted in the slots.

* * * * *